US010518986B2

(12) United States Patent
Kobayashi et al.

(10) Patent No.: US 10,518,986 B2
(45) Date of Patent: Dec. 31, 2019

(54) METHOD FOR CONVEYING REACTION TUBE UNIT

(71) Applicant: Tokyo Electron Limited, Tokyo (JP)

(72) Inventors: Masahiro Kobayashi, Iwate (JP);
Tamotsu Hatakeyama, Iwate (JP);
Harunari Hasegawa, Iwate (JP);
Michihiro Takahashi, Iwate (JP);
Daisuke Yamanaka, Iwate (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 16/404,033

(22) Filed: May 6, 2019

(65) Prior Publication Data

US 2019/0344981 A1 Nov. 14, 2019

(30) Foreign Application Priority Data

May 14, 2018 (JP) .................. 2018-093310

(51) Int. Cl.
*B65G 49/05* (2006.01)
*B01J 19/24* (2006.01)

(52) U.S. Cl.
CPC .......... *B65G 49/05* (2013.01); *B01J 19/2415* (2013.01)

(58) Field of Classification Search
CPC ..................... B65G 49/05; B01L 19/2415
USPC .................................. 198/617, 866
See application file for complete search history.

(56) References Cited

U.S. PATENT DOCUMENTS

| | | | | |
|---|---|---|---|---|
| 5,229,576 A * | 7/1993 | Nakao | ...................... | H05B 3/64 219/390 |
| 5,622,639 A * | 4/1997 | Kitayama | ............... | C30B 31/12 219/390 |
| 6,101,844 A * | 8/2000 | Fowler | ..................... | C23C 16/44 118/715 |
| 6,407,368 B1 * | 6/2002 | Hsu | ......................... | C30B 25/10 118/50.1 |
| 6,495,805 B2 * | 12/2002 | Sakamoto | ......... | H01L 21/67248 118/724 |
| 6,709,525 B2 * | 3/2004 | Song | ....................... | C23C 16/44 118/724 |
| 6,730,885 B2 * | 5/2004 | Suzuki | ............. | H01L 21/67109 219/486 |
| 8,172,947 B2 * | 5/2012 | Shibata | ............ | H01L 21/67126 118/715 |
| 8,709,159 B2 * | 4/2014 | Okamura | .......... | H01L 21/67248 118/715 |
| 9,938,375 B2 * | 4/2018 | Siebecke | .............. | B01J 19/0013 |
| 10,239,710 B2 * | 3/2019 | Gaenz | .................... | B65G 61/00 |
| 10,297,114 B2 * | 5/2019 | Emura | ................... | G06Q 50/34 |
| 10,385,276 B2 * | 8/2019 | Spitzauer | ................. | C10G 1/06 |

FOREIGN PATENT DOCUMENTS

JP 10-098002 A 4/1998

* cited by examiner

*Primary Examiner* — Douglas A Hess
(74) *Attorney, Agent, or Firm* — Abelman, Frayne & Schwab

(57) ABSTRACT

A method for conveying a reaction tube unit including a vertical reaction tube and a gas supply pipe provided at a distance from an inner wall of the vertical reaction tube along a longitudinal direction thereof, the method includes: arranging a buffer inside the reaction tube between the inner wall and the gas supply pipe to alleviate a collision; placing the reaction tube unit attached with the buffer on a carriage via a vibration isolator; and conveying the reaction tube unit by moving the carriage.

14 Claims, 7 Drawing Sheets

METHOD FOR CONVEYING REACTION TUBE UNIT

CROSS-REFERENCE TO RELATED APPLICATIONS

This application is based on and claims priority from Japanese Patent Application No. 2018-093310 filed on May 14, 2018 with the Japan Patent Office, the disclosure of which is incorporated herein in its entirety by reference.

TECHNICAL FIELD

The present disclosure relates a method for conveying a reaction tube unit.

BACKGROUND

A carriage is known to mount and convey a reaction tube made of quartz which is a component of a semiconductor manufacturing apparatus (see, e.g., Japanese Patent Laid-Open Publication No. 10-098002).

SUMMARY

According to an aspect of the present disclosure, there is provided a method for conveying a reaction tube unit including a reaction tube unit and a gas supply pipe at a distance from an inner wall of the vertical reaction tube along a longitudinal direction thereof. The method includes: arranging a buffer inside the reaction tube between the inner wall and the gas supply pipe to alleviate a collision; placing the reaction tube unit attached with the buffer on a carriage via a vibration isolator; and conveying the reaction tube unit by moving the carriage.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, non-limiting exemplary embodiments of the present disclosure will be described with reference to the accompanying drawings. In all of the accompanying drawings, the same or corresponding members or parts are denoted by the same or corresponding reference numerals, and redundant explanations are omitted.

(Vertical Heat Treatment Apparatus)

Figure 1:
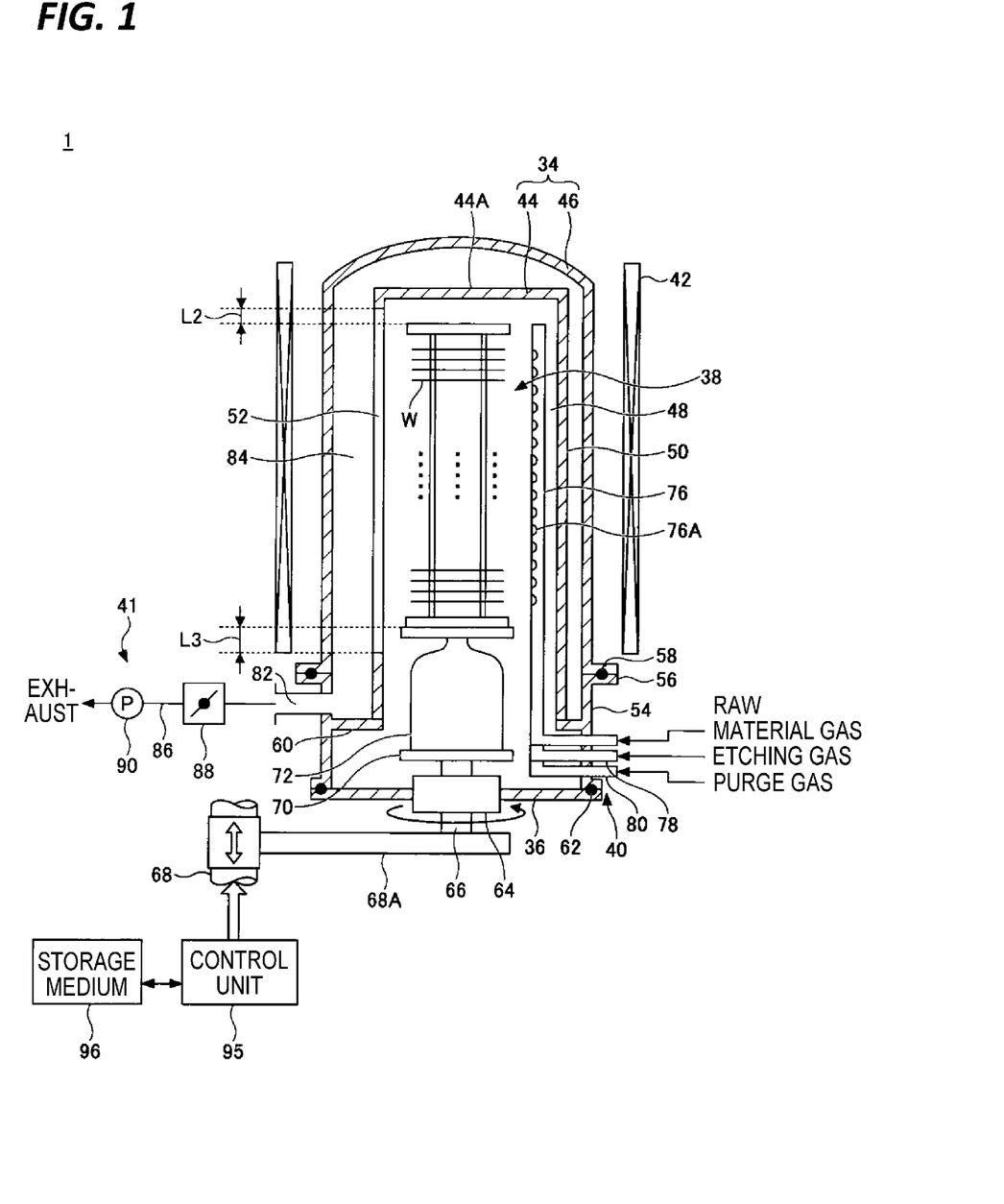
FIG. 1 is a cross-sectional view (1) illustrating an exemplary configuration of a vertical heat treatment apparatus.
Figure 2:
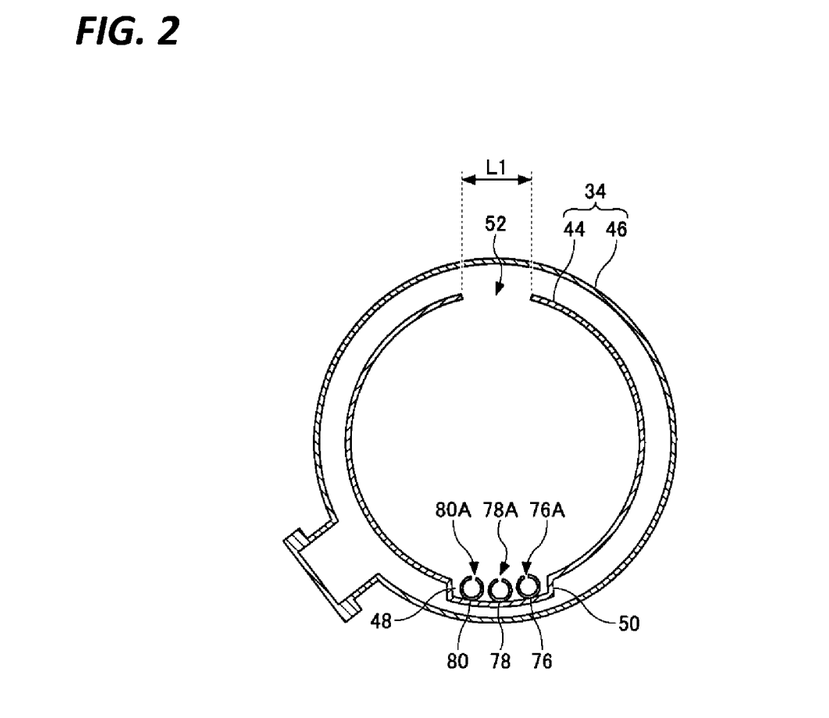
FIG. 2 is a cross-sectional view (2) illustrating the exemplary configuration of the vertical heat treatment apparatus.

Firstly, an exemplary configuration of a vertical heat treatment apparatus that has a reaction tube unit conveyable by a conveying method according to an embodiment will be described. Hereinafter, a vertical heat treatment apparatus having a double tube structure will be described, but a vertical heat treatment apparatus may have a single tube structure. FIGS. 1 and 2 are cross-sectional views illustrating an exemplary configuration of a vertical heat treatment apparatus, and FIG. 1 illustrates a longitudinal cross-section and FIG. 2 illustrates a transverse cross-section.

As illustrated in FIG. 1, a vertical heat treatment apparatus 1 includes a reaction tube 34 that accommodates a semiconductor wafer (hereinafter, referred to as a "wafer W") which is a substrate, a cover body 36 that air-tightly closes an opening at a lower end of the reaction tube 34, a wafer boat 38 that is able to be accommodated in the reaction tube 34 and serves as a substrate holder that holds a plurality of wafers W at predetermined intervals, a gas supply unit 40 that introduces a gas into the reaction tube 34, an exhaust unit 41 that exhausts the gas in the reaction tube 34, and a heating unit 42 that heats the wafer W.

The reaction tube 34 includes an inner tube 44 having a cylindrical shape that is opened at a lower end and has a ceiling, and an outer tube 46 having a cylindrical shape that is opened at a lower end and has a ceiling, and covers an outside of the inner tube 44. The inner tube 44 and the outer tube 46 are formed of an insulating material such as quartz, and coaxially arranged to be a double tube structure.

A ceiling portion 44A of the inner tube 44 is, for example, flat. At one side of the inner tube 44, a nozzle accommodating portion 48 that accommodates a gas supply pipe along the longitudinal direction (vertical direction) thereof is formed. For example, as illustrated in FIG. 2, a block portion 50 is formed by protruding a portion of a side wall of the inner tube 44 toward the outside, and the inside of the block portion 50 is formed as the nozzle accommodating portion 48. A rectangular opening 52 having a width L1 along the longitudinal direction (vertical direction) is formed on a side wall of an opposite side of the inner tube 44 to be opposite to the nozzle accommodating portion 48.

The opening 52 is a gas exhaust port formed so as to exhaust the gas in the inner tube 44. The opening 52 has the same length as that of the wafer boat 38, or extends in both the upper and lower directions to be longer than the length of the wafer boat 38. That is, an upper end of the opening 52 extends to be positioned at a height equal to or higher than a position corresponding to an upper end of the wafer boat 38, and an lower end of the opening 52 extends to be positioned at a height equal to or lower than a position corresponding to a lower end of the wafer boat 38. Specifically, as illustrated in FIG. 1, a distance L2 in the height direction between the upper end of the wafer boat 38 and the upper end of the opening 52 is in a range of about 0 mm to 5 mm. A distance L3 in the height direction between the lower end of the wafer boat 38 and the lower end of the opening 52 is in a range of about 0 mm to 350 mm.

A lower end of the reaction tube 34 is supported by a cylindrical-shaped manifold 54 formed of, for example, stainless steel. A flange portion 56 is formed on an upper end of the manifold 54, and a lower end of the outer tube 46 is installed to be supported on the flange portion 56. A seal member 58 such as an O-ring is interposed between the flange portion 56 and the lower end of the outer tube 46 so that the inside of the outer tube 46 is in an air-tightly sealed state.

An annular support portion 60 is provided at an inner wall of the upper portion of the manifold 54, and a lower end of the inner tube 44 is installed to be supported on the support portion 60. The cover body 36 is air-tightly attached to an opening at a lower end of the manifold 54 via a seal member 62 such as an O-ring, so as to air-tightly close the opening at the lower end of the reaction tube 34, that is, the opening of the manifold 54. The cover body 36 is made of, for example, stainless steel.

A rotation shaft 66 is provided at the center portion of the cover body 36 to penetrate through a magnetic fluid sealing portion 64. A lower portion of the rotation shaft 66 is rotatably supported by an arm 68A of a lifting unit 68 constituted by a boat elevator.

A rotation plate 70 is provided at the upper end of the rotation shaft 66, and the wafer boat 38 that holds the wafers W is placed on the rotation plate 70 via a heat retention pedestal 72 made of quartz. Therefore, the cover body 36 and the wafer boat 38 are integrally moved up or down by lifting or lowering the lifting unit 68, so that the wafer boat 38 can be inserted into or removed from the reaction tube 34.

The gas supply unit 40 is provided at the manifold 54, and introduces a gas such as a film forming gas, an etching gas, or a purge gas into the inner tube 44. The gas supply unit 40 includes a plurality of (e.g., three) gas supply pipes 76, 78, and 80 made of quartz. Each of the gas supply pipes 76, 78, and 80 is provided in the inner tube 44 along the longitudinal direction thereof, and its base end is bent in an L-shape and supported so as to penetrate the manifold 54.

As illustrated in FIG. 2, the gas supply pipes 76, 78, and 80 are installed to be aligned in a line along the circumferential direction in the nozzle accommodating portion 48 of the inner tube 44. A plurality of gas holes 76A, 78A, and 80A are formed on the gas supply pipes 76, 78, and 80, respectively, at predetermined intervals along the longitudinal direction, and the respective gases can be discharged horizontally from each of the gas holes 76A, 78A, and 80A. The predetermined intervals are set to be, for example, the same as the intervals of the wafers W supported by the wafer boat 38. Further, a position in a height direction is set such that each of the gas holes 76A, 78A, and 80A is positioned in the middle of the wafers W adjacent in the vertical direction, and each gas can be efficiently supplied to the space between the wafers W. As the type of gas, a film forming gas, an etching gas, and a purge gas are used, and each gas can be supplied through each of the gas supply pipes 76, 78, and 80 as necessary while controlling the flow rate of each gas.

A gas outlet 82 is formed above the support portion 60 that is a side wall of the upper portion of the manifold 54, and is configured to be able to exhaust the gas in the inner tube 44 discharged from the opening 52 through a space 84 between the inner tube 44 and the outer tube 46. The exhaust unit 41 is provided at the gas outlet 82. The exhaust unit 41 includes an exhaust passage 86 that is connected to the gas outlet 82, and a pressure adjusting valve 88 and a vacuum pump 90 are sequentially interposed in the exhaust passage 86 so as to process the inside of the reaction tube 34 to be a vacuum state.

A cylindrical-shaped heating unit 42 is provided to cover the outer tube 46 at the outer peripheral side of the outer tube 46. The heating unit 42 heats the wafer W accommodated in the reaction tube 34.

An entire operation of the vertical heat treatment apparatus 1 is controlled by, for example, a control unit 95 such as a computer. Further, a computer program that performs the entire operation of the vertical heat treatment apparatus 1 is stored in a storage medium 96. The storage medium 96 may be, for example, a flexible disk, a compact disk, a hard disk, a flash memory, and a DVD.

(Method for Conveying Reaction Tube Unit)

An example of a method for conveying the reaction tube unit according to the embodiment will be described. The method for conveying the reaction tube unit according to the embodiment may be used, for example, when the reaction unit is conveyed and moved in a case of newly introducing a vertical heat treatment apparatus or cleaning an existing reaction tube. The reaction tube unit is a structure that is assembled by attaching a plurality of components of a batch type vertical heat treatment apparatus that performs a heat treatment on a plurality of wafers at once. The components are, for example, a reaction tube, a gas introducing pipe, and a heat retention pedestal. The reaction tube may be a single tube structure, or a double tube structure having an inner tube and an outer tube. According to the conveying method for the reaction tube unit according to the embodiment, a buffer member that alleviate a collision between the inner wall surface of the reaction tube and the gas supply pipe is attached to the inside of the reaction tube, and the reaction tube is arranged on a carriage via a vibration isolating member and conveyed. As a result, it is possible to suppress vibration at the time of conveyance of the reaction tube unit by the carriage, and further, it is possible to suppress the reaction tube from being brought into contact with the gas supply pipes due to the vibration of the gas supply pipes, and the reaction tube from being damaged.

Figure 3:
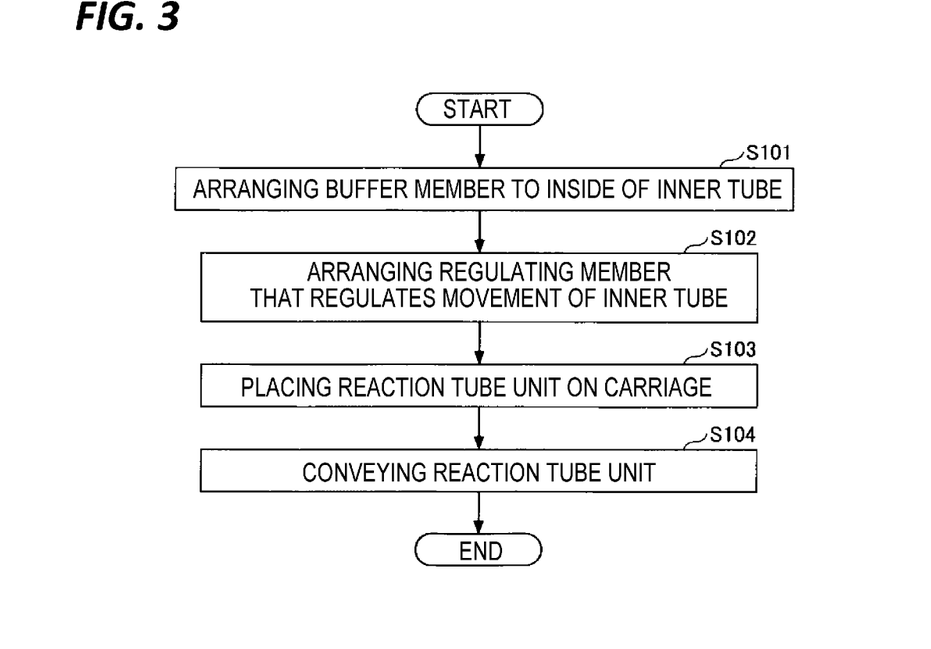
FIG. 3 is a flowchart illustrating an example of a conveying method for a reaction tube unit.

Hereinafter, as an example of the conveying method for the reaction tube unit according to the embodiment, a case of conveying a reaction tube unit that is assembled by attaching the gas supply pipe to the reaction tube (inner tube and outer tube) will be described. FIG. 3 is a flow chart illustrating an example of the conveying method for the reaction tube unit.

The conveying method for the reaction tube unit according to the embodiment includes a step of arranging the buffer member to the inside of the inner tube S101, a step of arranging a regulating member that regulates the movement of the inner tube S102, a step of placing the reaction tube unit on the carriage S103, and a step of conveying the reaction tube unit S104.

Step S101 is a step of arranging the buffer member to the inside of the inner tube. In step S101, for example, the buffer member is arranged along the inner wall surface of the inner tube. In step S101, the buffer member may be arranged so as to regulate the movement of the gas supply pipe in the central direction of the inner tube. As a result, the vibration may be reduced by reducing the vibration amplitude of the gas supply pipe. Further, in step S101, an elastic member may be used as the buffer member, and the buffer member may be arranged so as to press the gas supply pipe in the direction toward the inner wall surface by the elastic force. As a result, since the gas supply pipe is in a state of pressing the buffer member by the repulsive force that tends to return in the central direction of the inner tube 44, the rattling of the gas supply pipe due to the vibration of the reaction tube unit is hardly generated.

Figure 4:
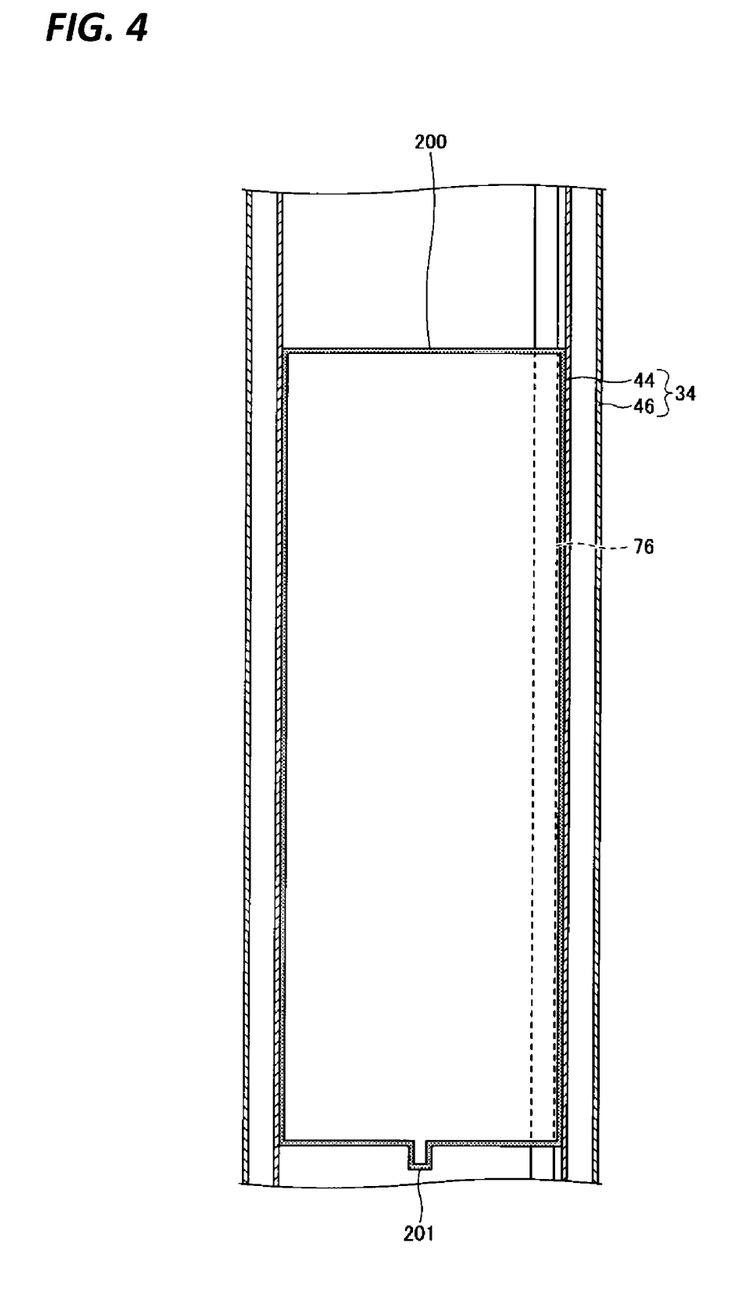
FIG. 4 is a cross-sectional view (1) illustrating an exemplary configuration of a buffer member.
Figure 5:
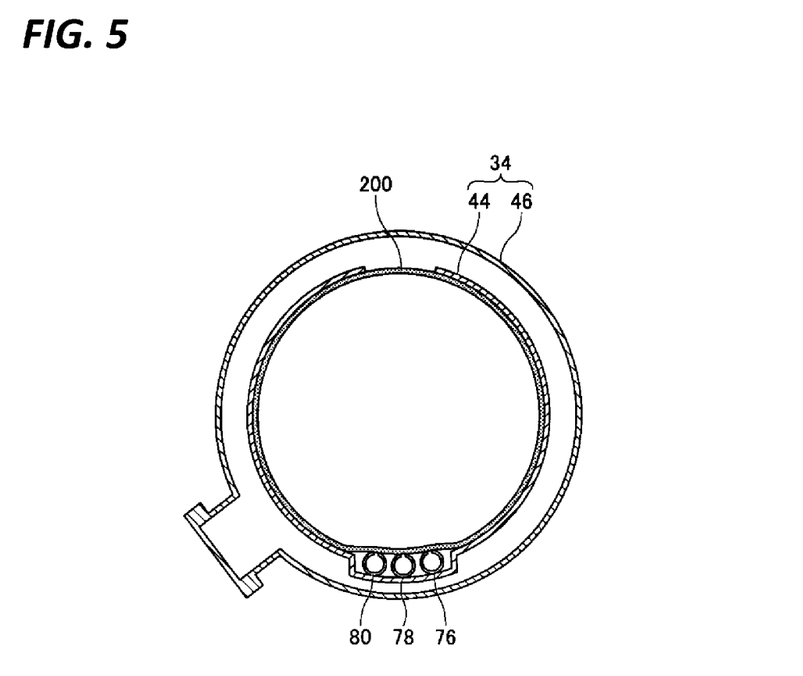
FIG. 5 is a cross-sectional view (2) illustrating the exemplary configuration of the buffer member.

FIGS. 4 and 5 are cross-sectional views illustrating an exemplary configuration of a buffer member 200, and FIG. 4 illustrates a longitudinal cross-section and FIG. 5 illustrates a transverse cross-section. In FIG. 4, illustration of gas supply pipes 78 and 80 is omitted. As illustrated in FIGS. 4 and 5, the buffer member 200 is arranged inside the inner tube 44 and has a substantially cylindrical shape along the inner wall surface of the inner tube 44. An outer periphery of the buffer member 200 is brought into contact with the gas supply pipes 76, 78, and 80 attached to the reaction tube 34, and the buffer member 200 regulates the movement of the gas supply pipes 76, 78, and 80 in the central direction of the inner tube 44. The buffer member 200 may be a balloon that is formed of, for example, vinyl or an antistatic film, and has an introducing port 201 into which a gas such as air is introduced. By using the balloon as the buffer member 200, the buffer member 200 may be arranged inside the inner tube 44 by a simple operation of introducing and removing air into and from inside the inner tube 44. Further, since the size of the balloon may be easily changed by adjusting the amount of the air, it is possible to cope with the inner tube 44 having different sizes with one buffer member 200.

Although descriptions have been made on the case where a temperature sensor is not arranged inside the reaction tube 34 in the example in FIGS. 4 and 5, the same buffer member 200 may be used even in a case where the temperature sensor is arranged.

Although descriptions have been made on the case where the buffer member 200 is a balloon into which a gas such as air is introduced, the buffer member 200 is not limited thereto, and may be, for example, a cushion material such as urethane. In a case where the cushion material such as urethane is used as the buffer member 200, the buffer member 200 may be processed into, for example, a substantially cylindrical shape, and be arranged inside the inner tube 44 so as to regulate the movement of the gas supply pipes 76, 78, and 80 in the central direction of the inner tube 44.

Step S102 is a step of arranging the regulating member that regulates the movement of the inner tube. In step S102, for example, the regulating member that regulates the movement of the inner tube in the radial direction is arranged on the flange portion of the manifold attached to the outer tube. By arranging the regulating member, it is possible to prevent the inner tube from being moved due to the vibration of the reaction tube unit, and the inner tube from being brought into contact with other members (e.g., outer tube) and being broken.

Figure 6:
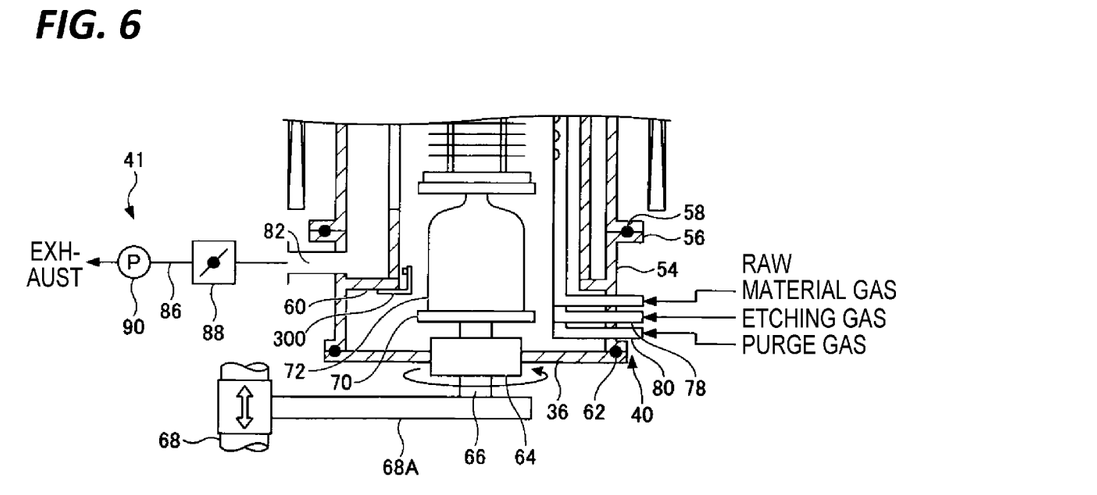
FIG. 6 is a cross-sectional view illustrating an exemplary configuration of a regulating member.
Figure 7:
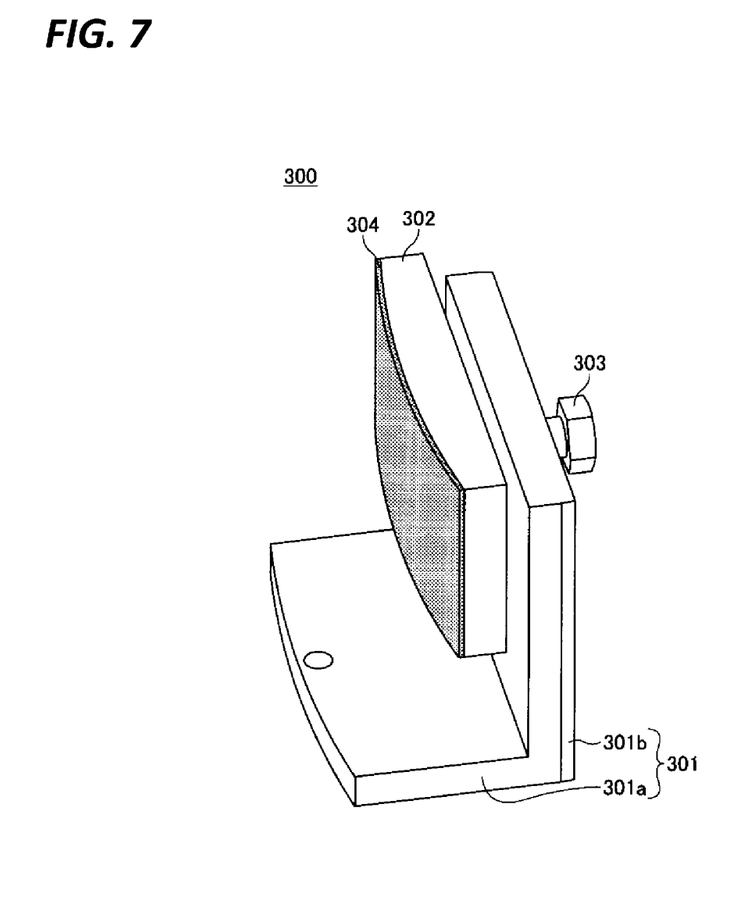
FIG. 7 is a perspective view illustrating the exemplary configuration of the regulating member.

FIGS. 6 and 7 are a cross-sectional view and a perspective view that each illustrates the exemplary configuration of the regulating member. As illustrated in FIGS. 6 and 7, a regulating member 300 is attached to, for example, the support portion 60 of the manifold 54 attached to the outer tube 46. The regulating member 300 includes a fixing portion 301, a moving portion 302, an adjusting portion 303, and a seal member 304.

The fixing portion is formed in an L-shape having a horizontal portion 301a and a vertical portion 301b, and the horizontal portion 301a is fixed to the support portion 60 by, for example, a fasten member (not illustrated). The moving portion 302 is attached to the vertical portion 301b so as to be movable in the radial direction of the inner tube 44 by the adjusting portion 303 such as a screw. The seal member 304 is provided on the side of the inner tube 44 in the moving portion 302. The seal member 304 may be, for example, a fluororubber sheet. In step S102, the moving portion 302 is moved to the side of the inner tube 44 by the adjusting portion 303 so that the seal member 304 is brought into contact with the inner wall surface of the inner tube 44. As a result, it is possible to suppress the movement of the inner tube 44 in the radial direction. Further, it is possible to suppress the movement of the inner tube 44 in the vertical direction by the frictional force between the seal member 304 and the inner wall surface of the inner tube 44.

Step S103 is a step of placing the reaction tube unit, to which the buffer member and the regulating member are attached, on the carriage via the vibration isolating member. In step S103, since the reaction tube unit is placed on the carriage via the vibration isolating member, the vibration of the carriage is absorbed by the vibration isolating member so that the vibration transferred to the reaction tube unit is reduced.

Figure 8A:
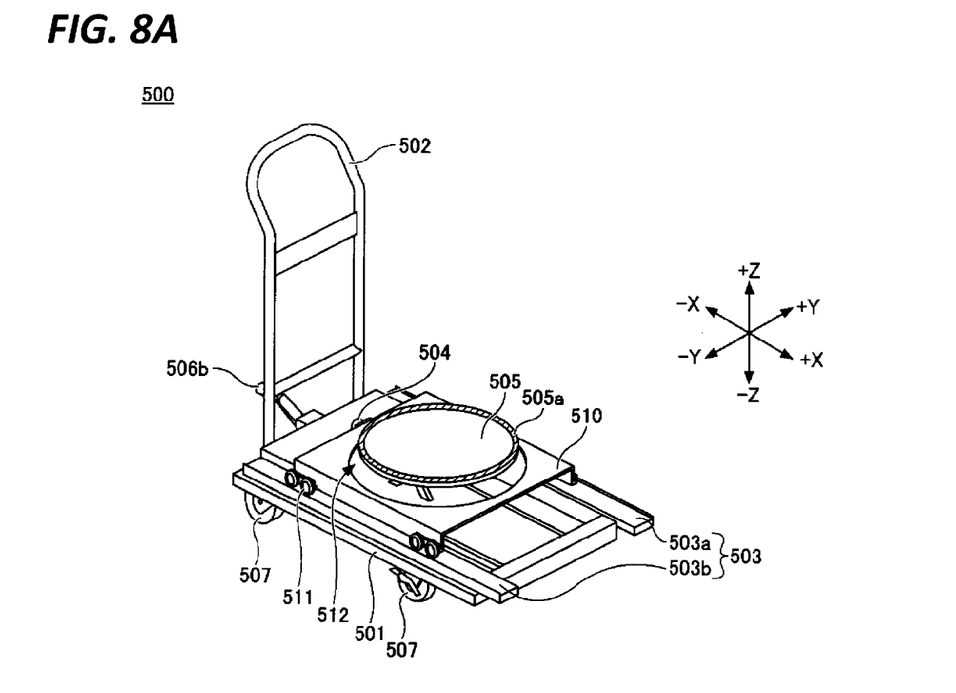
FIGS. 8A and 8B are views (1) illustrating an exemplary configuration of a carriage.
Figure 8B:
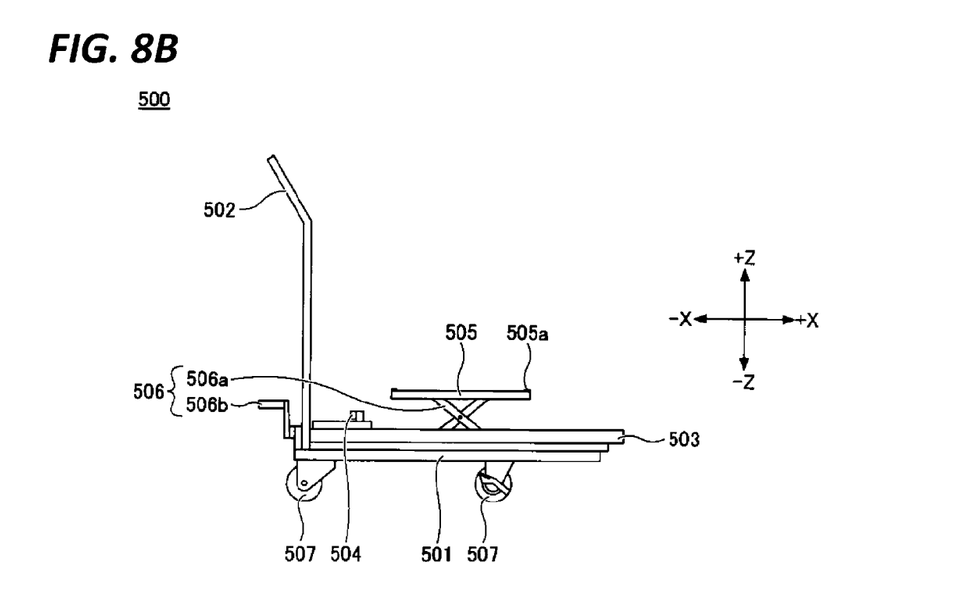
Figure 9A:
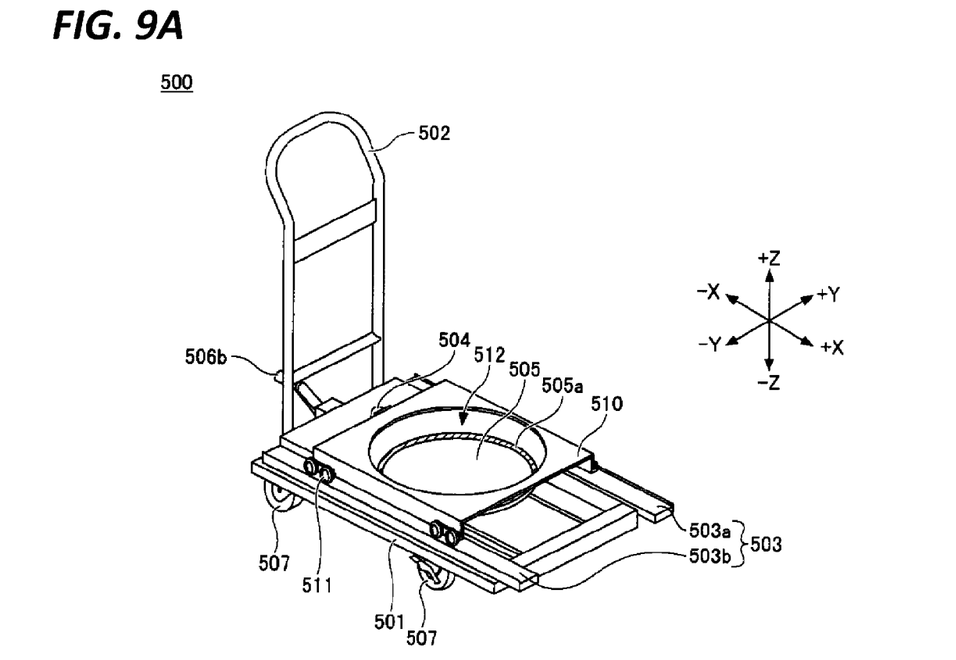
FIGS. 9A and 9B are views (2) illustrating the exemplary configuration of the carriage.
Figure 9B:
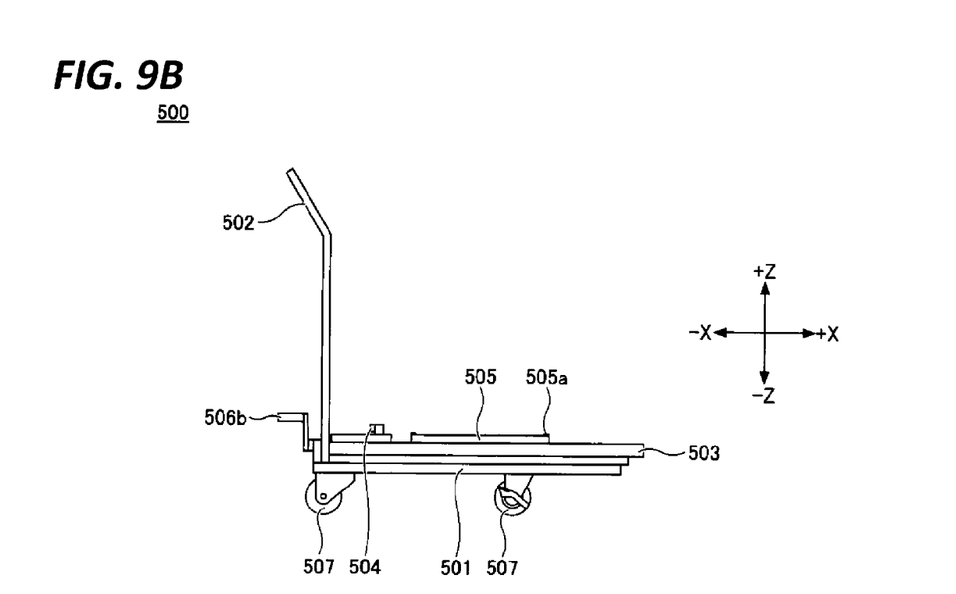

FIGS. 8A, 8B, 9A, and 9B are views illustrating an exemplary configuration of the carriage, and FIGS. 8A and 8b illustrate a state where the lifting portion of the carriage is raised, and FIGS. 9A and 9B illustrate a state where the lifting portion of the carriage is lowered. FIGS. 8A and 9A are perspective views of the carriage, and FIGS. 8B and 9B are side views of the carriage. FIGS. 8A and 9A illustrate a state where a cart is mounted on the carriage, and FIGS. 8B and 9B illustrate a state where the cart is not mounted on the carriage. Hereinafter, for convenience of explanation, in FIGS. 8A, 8B, 9A, and 9B, it will be described by assuming that +X direction is a front direction, –X direction is a rear direction, +Y direction is a left direction, –Y direction is a right direction, +Z direction is an upward direction, and –Z direction is a downward direction.

The carriage 500 is a movable type tube cart configured to be movable in the horizontal direction while supporting the lower end of the reaction tube unit and mounting a movable cart 510. The carriage 500 includes a body 501, an operation handle 502, a guide rail 503, a cart fixing portion 504, a reaction tube support portion 505, a lifting mechanism 506, and casters 507.

The body 501 is formed in a rectangular shape in a plan view. The operation handle 502, the guide rail 503, the cart fixing portion 504, the reaction tube support portion 505, the lifting mechanism 506, and the casters 507 are attached to the body 501.

The operation handle 502 is attached to a rear end of the body 501, and is formed to extend upward from the body 501. The operation handle 502 is formed in, for example, a substantially U-shape. An operator may hold the operation handle 502 to move the carriage 500 in the front-rear direction and in the left-right direction.

For example, two guide rails 503 are provided. Two guide rails 503a and 503b extend in the front-rear direction on an upper surface of the body 501, and are arranged to be parallel to each other on a left end and a right end of the body 501, respectively. Wheels 511 are provided at the cart 510 corresponding to each of two guide rails 503a and 503b, and are movable in the front-rear direction on the guide rails 503. Further, an opening 512 that is larger than an outer diameter of the reaction tube support portion 505 is formed at the cart 510. The opening 512 is formed at a position where the reaction tube support portion 505 is able to move between the lower side and the upper side of the cart 510 through the opening 512, when the cart 510 is positioned at the rear end of the guide rails 503.

The cart fixing portion 504 is a member such as a bolt that fixes the cart 510 to the body 501 at the rear end position of the guide rails 503.

The reaction tube support portion 505 moves up or down with respect to the body 501. The reaction tube support portion 505 is lifted and lowered by operating the lifting mechanism 506. The reaction tube support portion 505 may be, for example, a disc-shaped member on which the lower end of the reaction tube unit may be placed. A vibration isolating member 505a is provided on an outer peripheral portion of the upper surface of the reaction tube support portion 505, for example, a position where corresponds to the lower end of the reaction tube unit along the circumferential direction. As a result, since the reaction tube unit is supported by the reaction tube support portion 505 via the vibration isolating member 505a, it is possible to suppress the vibration from being transferred to the reaction tube unit. The vibration isolating member 505a may be, for example, a vibration isolating gel. The vibration isolating gel has an effect of suppressing the resonance, so that the vibration itself may be suppressed.

The lifting mechanism 506 includes a stretchable portion 506a and a handle 506b. The stretchable portion 506a is attached between the upper surface of the body 501 and the reaction tube support portion 505. The handle 506b is attached to, for example, the rear end of the body 501, and stretches the stretchable portion 506a. When the handle 506b is operated by an operator, the reaction tube support portion 505 is raised or lowered with respect to the body 501. For example, when the reaction tube support portion 505 is raised to the rising end by operating the lifting mechanism 506, as illustrated in FIG. 8A, the position of the upper surface of the reaction tube support portion 505 is higher than the position of the upper surface of the cart 510. Meanwhile, when the reaction tube support portion 505 is lowered to the lowering end by operating the lifting mechanism 506, as illustrated in FIG. 9A, the position of the upper surface of the reaction tube support portion 505 is lower than the position of the upper surface of the cart 510. For example, when the reaction tube support portion 505 is raised from the lowering end toward the rising end while the reaction tube unit is placed on the cart 510, the reaction tube unit is supported by the upper surface of the reaction tube support portion 505 and separated from the cart 510.

A caster 507 is provided on the lower surface of the body 501. The caster 507 is, for example, a clean room corresponding caster. The caster 507 may include, for example, a caster that has a lock mechanism. In the illustrated example, the caster that has a lock mechanism is provided at the front side of the carriage 500.

Step S104 is a step of conveying the reaction tube unit placed on the carriage 500. In step S104, the reaction tube support portion 505 is raised so as to support the reaction tube unit from the lower side on the upper surface of the reaction tube support portion 505, and the carriage 500 is moved in a state where the reaction tube unit is separated from the cart 510. As a result, it is possible to prevent the vibration that becomes large due to transfer of the vibration of the carriage 500 to the cart 510 from being transferred to the reaction tube unit. Therefore, it is possible to suppress the vibration transferred to the reaction tube unit, compared with a case where the reaction tube unit is placed on the cart 510 and the carriage 500 is moved.

As described above, according to the present disclosure, the buffer member 200 is attached to the inside of the reaction tube 34 that alleviates the collision between the inner wall surface of the reaction tube 34 and the gas supply pipes 76, 78, and 80, and the reaction tube 34 is placed on the carriage 500 via the vibration isolating member 505a and is conveyed. As a result, it is possible to suppress the vibration at the time of conveyance of the reaction tube unit by the carriage 500, and further, it is possible to suppress the reaction tube 34 from being brought into contact with the gas supply pipes 76, 78, and 80 due to the vibration of the gas supply pipes 76, 78, and 80, and the reaction tube 34 from being damaged.

Further, according to the present disclosure, since the buffer member 200 is arranged to regulate the movement of the gas supply pipes 76, 78, and 80 in the central direction of the inner tube 44, it is possible to reduce the vibration amplitude of the gas supply pipes 76, 78, and 80, and reduce the vibration.

Further, according to the present disclosure, an elastic member is used as the buffer member 200, and the buffer member 200 is arranged so as to press the gas supply pipes 76, 78, and 80 in the direction of the inner wall surface of the inner tube 44 by the elastic force. As a result, the gas supply pipes 76, 78, and 80 are in a state of pressing the buffer member 200 by the repulsive force that tends to return in the central direction of the inner tube 44. Therefore, the rattling of the gas supply pipes 76, 78, and 80 due to the vibration of the reaction tube unit is hardly generated.

Further, according to the present disclosure, the reaction tube support portion 505 of the carriage 500 is raised so as to support the reaction tube unit from the lower side on the upper surface of the reaction tube support portion 505, and the carriage 500 is moved in a state where the reaction tube unit is separated from the cart 510. As a result, it is possible to prevent the vibration that becomes large due to transfer of the vibration of the carriage 500 to the cart 510 from being transferred to the reaction tube unit. Therefore, it is possible to suppress the vibration transferred to the reaction tube unit, compared with a case where the reaction tube unit is placed on the cart 510 and the carriage 500 is moved.

Further, according to the present disclosure, the regulating member 300 that regulates the movement of the inner tube 44 in the radial direction is arranged on the support portion 60 of the manifold 54 attached to the outer tube 46. As a result, it is possible to prevent the inner tube 44 from being moved due to the vibration of the reaction tube unit, and the inner tube 44 from being brought into contact with other members (e.g., outer tube 46) and being broken.

According to the present disclosure, the vibration at the time of conveyance of the reaction tube unit may be suppressed.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for conveying a reaction tube unit including a vertical reaction tube and a gas supply pipe provided at a distance from an inner wall of the vertical reaction tube along a longitudinal direction thereof, the method comprising:
   arranging a buffer inside the reaction tube between the inner wall and the gas supply pipe to alleviate a collision;
   placing the reaction tube unit attached with the buffer on a carriage via a vibration isolator; and
   conveying the reaction tube unit by moving the carriage.

2. The method according to claim 1, wherein the buffer is arranged inside the reaction tube along the inner wall of the reaction tube.

3. The method according to claim 2, wherein the buffer regulates movement of the gas supply pipe in a central direction of the reaction tube.

4. The method according to claim 3, wherein the buffer is formed of an elastic material.

5. The method according to claim 4, wherein the carriage includes a support configured to support the reaction tube unit from below and a lift configured to move up and down the support, and in the conveying the reaction tube unit, the reaction tube unit is supported from below by the support, thereby moving the carriage in a state where the support is moved up by the lift.

6. The method according to claim 5, wherein the reaction tube has a double-tube structure including an inner tube and an outer tube.

7. The method according to claim 6, further comprising:
arranging a regulator configured to regulate movement of the inner tube before the conveying the reaction tube unit.

8. The method according to claim 7, wherein the regulator is brought into contact with an inner wall of the inner tube to regulate the movement of the inner tube.

9. The method according to claim 1, wherein the buffer regulates movement of the gas supply pipe in a central direction of the reaction tube.

10. The method according to claim 1, wherein the buffer is formed of an elastic material.

11. The method according to claim 1, wherein the carriage includes a support configured to support the reaction tube unit from below and a lift configured to move up and down the support, and in the conveying the reaction tube unit, the reaction tube unit is supported from below by the support, thereby moving the carriage in a state where the support portion is moved up by the lift.

12. The method according to claim 1, wherein the reaction tube has a double tube structure including an inner tube and an outer tube.

13. The method according to claim 1, further comprising:
arranging a regulator configured to regulate movement of the inner tube before the conveying the reaction tube unit.

14. The method according to claim 13, wherein the regulator is brought into contact with an inner wall of the inner tube.

* * * * *